(12) United States Patent
Döring

(10) Patent No.: US 9,587,539 B2
(45) Date of Patent: Mar. 7, 2017

(54) EXHAUST GAS AFTER-TREATMENT SYSTEM AND METHOD FOR THE EXHAUST GAS AFTER-TREATMENT

(71) Applicant: Andreas Döring, München (DE)

(72) Inventor: Andreas Döring, München (DE)

(73) Assignee: MAN Diesel & Turbo SE, Augsburg (DE)

( * ) Notice: Subject to any disclaimer, the term of this patent is extended or adjusted under 35 U.S.C. 154(b) by 11 days.

(21) Appl. No.: 14/678,640

(22) Filed: Apr. 3, 2015

(65) Prior Publication Data

US 2015/0285114 A1 Oct. 8, 2015

(30) Foreign Application Priority Data

Apr. 8, 2014 (DE) .................. 10 2014 005 153

(51) Int. Cl.
*B01D 53/92* (2006.01)
*B01D 53/94* (2006.01)
*F01N 3/023* (2006.01)
*F01N 3/035* (2006.01)
*F01N 13/00* (2010.01)
*F01N 3/10* (2006.01)

(52) U.S. Cl.
CPC ............ *F01N 3/035* (2013.01); *B01D 53/94* (2013.01); *B01D 53/944* (2013.01); *B01D 53/9477* (2013.01); *F01N 3/023* (2013.01); *F01N 3/0231* (2013.01); *F01N 3/103* (2013.01); *F01N 3/106* (2013.01); *F01N 13/011* (2014.06); *B01D 2255/2022* (2013.01); *B01D 2255/2027* (2013.01); *B01D 2255/2065* (2013.01); *B01D 2255/20707* (2013.01); *B01D 2255/20738* (2013.01); *B01D 2255/20776* (2013.01); *B01D 2255/30* (2013.01); *B01D 2255/80* (2013.01); *B01D 2255/9045* (2013.01); *B01D 2258/01* (2013.01); *F01N 2340/06* (2013.01); *F01N 2570/04* (2013.01)

(58) Field of Classification Search
CPC .. B01D 53/92; B01D 53/94; B01D 2201/085; B01D 2258/01; B01D 2258/012; B01D 2259/4566; B01D 46/006; B01D 41/00; F01N 3/023; F01N 3/0231
See application file for complete search history.

(56) References Cited

U.S. PATENT DOCUMENTS

| | | | | |
|---|---|---|---|---|
| 4,902,487 A | * | 2/1990 | Cooper | C09C 1/50 423/215.5 |
| 6,941,742 B1 | * | 9/2005 | Neufert | B01D 53/8609 423/238 |
| 2001/0052232 A1 | * | 12/2001 | Hoffmann | B01D 53/9431 60/285 |
| 2010/0037607 A1 | * | 2/2010 | Doring | F01N 3/0231 60/602 |
| 2010/0224070 A1 | * | 9/2010 | Patterson | B01D 53/1425 96/181 |
| 2014/0216016 A1 | * | 8/2014 | Otsuki | B01D 46/2418 60/297 |
| 2015/0004068 A1 | * | 1/2015 | Andreasson | F01N 3/2066 422/171 |
| 2015/0275722 A1 | * | 10/2015 | Doering | F01N 3/0231 60/274 |

FOREIGN PATENT DOCUMENTS

EP 2328675 B1 * 5/2013 ........... B01D 53/501

OTHER PUBLICATIONS

S. J. Jelles et al. "The influence of NOx on the oxidation of metal activated diesel soot" Catalysis Today, vol. 53, (1999) pp. 623-630.*

* cited by examiner

*Primary Examiner* — Timothy Vanoy
(74) *Attorney, Agent, or Firm* — Cozen O'Connor

(57) ABSTRACT

An exhaust gas after-treatment system for an internal combustion engine, with a particle filter arranged downstream of an internal combustion engine for filtering soot out of the exhaust gas, and with an oxidation catalytic converter arranged upstream of the particle filter and downstream of the internal combustion engine for the oxidation of $SO_2$ into $SO_3$. The $SO_3$ and/or precipitated $H2SO_4$ serves for the oxidation of soot in the particle filter and thus for the regeneration of the particle filter.

14 Claims, 1 Drawing Sheet

EXHAUST GAS AFTER-TREATMENT SYSTEM AND METHOD FOR THE EXHAUST GAS AFTER-TREATMENT

BACKGROUND OF THE INVENTION

1. Field of the Invention

The invention relates to an exhaust gas after-treatment system. The invention, furthermore, relates to a method for the exhaust gas after-treatment.

2. Description of the Related Art

Exhaust gas after-treatment systems of internal combustion engines are known, which comprise a particle filter and at least one exhaust gas after-treatment assembly arranged in flow direction of the exhaust gas, upstream of the particle filter. The exhaust gas after-treatment assembly, is, in particular, an oxidation catalytic converter for the oxidation of nitrogen monoxide (NO) into nitrogen dioxide ($NO_2$). The term particle filter means both conventional particle filters through which the exhaust gas flows, as well as particle filters in which the exhaust gas flow is conducted along a separating structure.

In particular, when seen in flow direction of the exhaust gas flow upstream of the particle filter, an oxidation catalytic converter for the oxidation of NO into $NO_2$ is positioned, NO oxidised into $NO_2$ with the help of the residual oxygen $O_2$ contained in the exhaust gas flow in the oxidation catalytic converter according to the following equation:

$$2NO+O_2 \leftrightarrow 2NO_2$$

With this oxidation of nitrogen monoxide into nitrogen dioxide, the equilibrium of the oxidation reaction at high temperatures is on the side of nitrogen monoxide. This results in that the achievable component of nitrogen dioxide is greatly limited at high temperatures.

In the particle filter, the nitrogen dioxide extracted in the oxygen catalytic converter is converted with carbon-containing particles, so-called soot, collecting in the particle filter into carbon monoxide (CO), carbon dioxide ($CO_2$), nitrogen ($N_2$) and nitrogen monoxide (NO). In the process, a continuous removal of the carbon-containing particulate matter or of the soot accumulated in the particle filter takes place in the sense of a passive regeneration of the particle filter, wherein this conversion takes place according to the following equations:

$$2NO_2+C \rightarrow 2NO+CO_2$$

$$NO_2+C \rightarrow NO+CO$$

$$2C+2NO_2 \rightarrow N_2+2CO_2$$

In particular when with such passive regeneration of the particle filter no complete conversion of the carbon-containing particulate matter or of the soot embedded in the particle filter can take place, the carbon content or soot content in the particle filter increase, the particle filter then having a tendency towards clogging as a result of which ultimately the exhaust gas backpressure on an internal combustion engine upstream of the exhaust gas after-treatment system increases. An increasing exhaust gas backpressure on the internal combustion engine diminishes the power of the internal combustion engine and causes increased fuel consumption.

To avoid an increase of the carbon-containing particulate matter or of the soot in the particle filter and thus clogging of the same, it is already known from practice to provide particle filters with a catalytic coating. Platinum-containing coatings are preferentially employed here. The use of such particle filters with catalytic coating however can prevent charging the particle filter with carbon-containing particulate matter, i.e. with soot, only to an insufficient degree.

Furthermore it is known from practice to employ active regeneration of the particle filter to reduce the charging of a particle filter with soot. During such active regeneration of the particle filter, the exhaust gas temperature is actively increased for example by adding fuel to the exhaust gas flow to burn off carbon-containing particulate matter or soot particles, which have accumulated in the particle filter, via an exothermic reaction or oxidation of the hydrocarbons. Burning off the carbon with the help of oxygen in a particle filter thus takes place according to the following equation:

$$C+O_2 \rightarrow CO_2$$

During active regeneration of a particle filter by burning off the soot particles, a major increase in temperature up to 1000° C. can develop in the particle filter. During such a major temperature increase, damage to the particle filter can occur.

SUMMARY OF THE INVENTION

The present invention is based on creating an exhaust gas after-treatment system and a method for the exhaust gas after-treatment.

The exhaust gas after-treatment system according to one embodiment of the invention for an internal combustion engine comprises a particle filter arranged downstream of an internal combustion engine for filtering soot out of the exhaust gas, and an oxidation catalytic converter arranged upstream of the particle filter and downstream of the internal combustion engine for the oxidation of $SO_2$ into $SO_3$, wherein the $SO_3$ and/or precipitated $H_2SO_4$ serves for the oxidation of soot in the particle filter and thus for the regeneration of the particle filter.

One embodiment of the present invention utilizes $SO_3$, in internal combustion engines, which combust sulphur-containing fuels, such as for example heavy fuel oil, for the regeneration of a soot particle filter, which $SO_3$ is generated in an oxidation catalytic converter for the oxidation of $SO_2$ into $SO_3$ arranged upstream of the particle filter. In internal combustion engines, such as for example marine diesel engines, which as fuel combust fuel having a relatively high sulphur contents such as for example heavy fuel oil, effective continuous regeneration of a particle filter can thus be provided.

According to one embodiment a mass ratio between $SO_3$ and soot downstream of the oxidation catalytic converter in the region of the particle filter amounts to at least 7:1, preferably at least 12:1, most preferably at least 16:1. These mass ratios between $SO_3$ and soot allow a particularly effective passive regeneration of the particle filter.

In the case of an exhaust gas supercharged internal combustion engine, the oxidation catalytic converter is positioned upstream of a turbine of an exhaust gas turbocharger, wherein the particle filter is positioned downstream of the turbine of the exhaust gas turbocharger. Through the relatively high temperatures and pressure which are present upstream of the turbine the oxidation of $SO_2$ into $SO_3$ in the oxidation catalytic converter is favored.

According to one embodiment an oxidation catalytic converter for the oxidation of NO into $NO_2$ is arranged upstream of the particle filter and downstream of the internal combustion engine, wherein the $NO_2$ serves for the oxidation of soot in the particle filter and thus the regeneration of the particle filter. During operation of the internal combustion engine with a fuel that has a relatively high sulphur content, the exhaust gas flow can be conducted via the oxidation catalytic converter for the oxidation of $SO_2$ into $SO_3$, whereas in the case of an operation of the internal combustion engine with a fuel that has a relatively low sulphur content, the exhaust gas flow can be conducted by the oxidation catalytic converter for the oxidation of NO into $NO_2$. This configuration is advantageous when internal combustion engines are operated with different types of fuel.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the invention are explained in more detail with the help of the drawing without being restricted to this. Here it shows.

DETAILED DESCRIPTION OF THE PRESENTLY PREFERRED EMBODIMENTS

The present invention relates to an exhaust gas after-treatment system for an internal combustion engine, for example for a stationary internal combustion engine in a power plant or for a non-stationary internal combustion engine employed on a ship, which is operated with fuel having a relatively high sulphur content such as heavy fuel oil.

Figure 1:
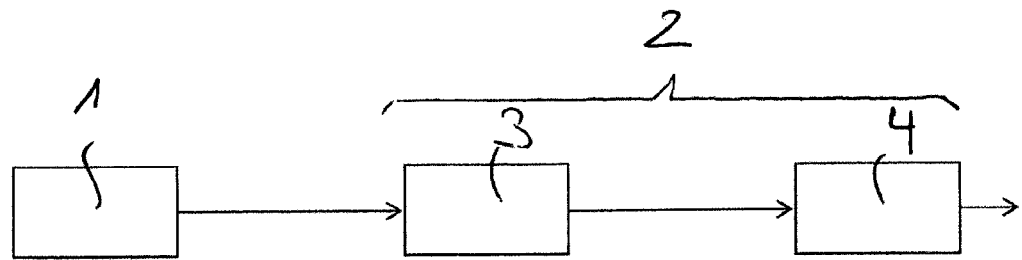
FIG. 1: is a block diagram of a first exhaust gas after-treatment system.

FIG. 1 shows a first exemplary embodiment of an exhaust gas after-treatment system 2 positioned downstream of an internal combustion engine 1, wherein the exhaust gas after-treatment system 2 comprises at least one oxidation catalytic converter 3 for the oxidation of $SO_2$ into $SO_3$ and a particle filter 4 arranged downstream of the oxidation catalytic converter 3 for filtering soot out of the exhaust gas of the internal combustion engine 1.

In the oxidation catalytic converter 3, the $SO_2$ contained in the exhaust gas of the internal combustion engine 1 is oxidised into $SO_3$, wherein the $SO_3$ extracted in the process serves for the oxidation of soot in the particle filter 4 and thus for the regeneration of the particle filter 4.

The oxidation of $SO_2$ into $SO_3$ in the oxidation catalytic converter 3 takes place according to the following reaction equation:

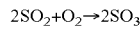
$$2SO_2 + O_2 \rightarrow 2SO_3$$

The oxidation of the soot in the particle filter 4 with the help of the $SO_3$ formed in the oxidation catalytic converter 3 in this case takes place according to the following reaction equations:

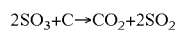
$$2SO_3 + C \rightarrow CO_2 + 2SO_2$$

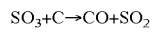
$$SO_3 + C \rightarrow CO + SO_2$$

Should the exhaust gas cool down below the sulphuric acid dew point, precipitation of $H_2SO_4$ (sulphuric acid) occurs. $H_2SO_4$ can likewise be utilised for the oxidation of soot in the particle filter 4 and for the regeneration of the particle filter 4. In the process, sulphuric acid can effectively oxidise soot in particular at exhaust gas temperatures below 250° C. and thus make possible effective regeneration of the particle filter 4.

The oxidation catalytic converter 3 utilises vanadium V and/or potassium K and/or sodium Na and/or iron Fe and/or cerium Ce and/or caesium Cs and/or oxides of these elements as active component for the oxidation of $SO_2$ into $SO_3$, wherein the oxidation catalytic converter 3 utilises titanium oxide $TiO_2$ and/or silicon oxide $SiO_2$ preferentially stabilised by tungsten oxide $WO_3$.

The component of vanadium in the oxidation catalytic converter 3, which is present as active component for the oxidation of $SO_2$ into $SO_3$, amounts to more than 5%, preferentially more than 7%, particularly preferably more than 9%.

The conversion of $SO_2$ into $SO_3$ in the oxidation catalytic converter 3 is effected in such a manner that downstream of the oxidation catalytic converter 3 in the region of the particle filter 4 there is a mass ratio between $SO_3$ and soot of at least 7:1, preferably of at least 12:1, particularly preferably of at least 16:1.

Figure 2:
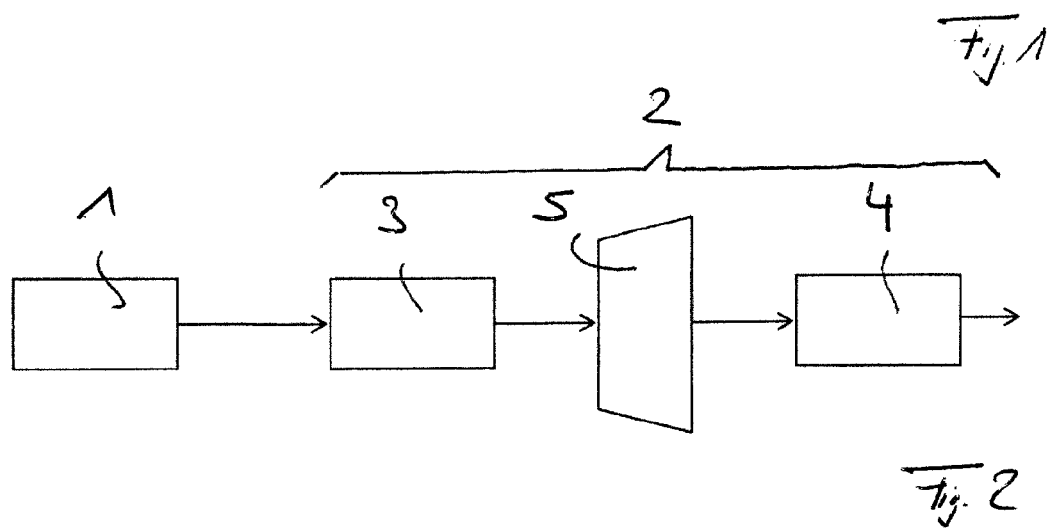
FIG. 2: is a block diagram of a second exhaust gas after-treatment system.

FIG. 2 shows a further development of the exhaust gas after-treatment system 2 of FIG. 1, wherein the internal combustion engine of FIG. 2 is an exhaust gas supercharged internal combustion engine, in which exhaust gas is expanded in a turbine 5 of an exhaust gas turbocharger to extract mechanical energy, which serves for driving a compressor of the exhaust gas turbocharger to compress charge air to be fed to the internal combustion engine 1 in the compressor of the exhaust gas turbocharger.

In particular when, as shown in FIG. 2, the exhaust gas after-treatment system 2 accordingly comprises a turbine 5 of an exhaust gas turbocharger is the oxidation catalytic converter 3 positioned upstream of the turbine 5 and the particle filter 4 downstream of the turbine 5. The high pressures and temperatures upstream of the turbine 5 of an exhaust gas turbocharger favour the oxidation of $SO_2$ into $SO_3$ in the oxidation catalytic converter 3.

Figure 3:
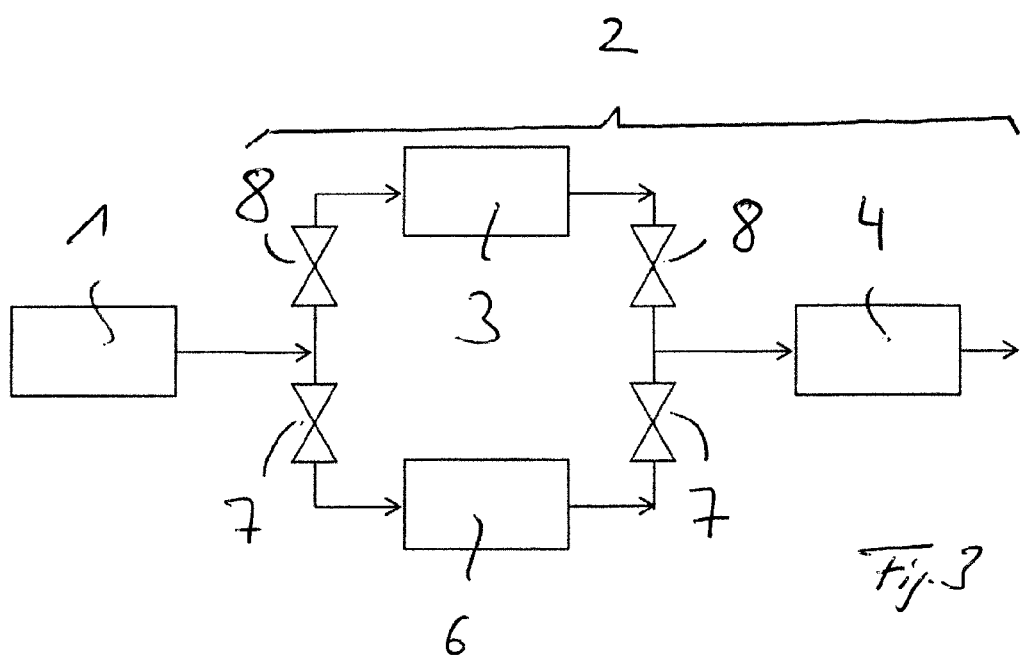
FIG. 3: is a block diagram of a third exhaust gas after-treatment system.

A further advantageous further development of the exhaust gas after-treatment system 2 of FIG. 1 is shown by FIG. 3, wherein the version of FIG. 3 is used in particular in internal combustion engines 1 operated both with fuel having a relatively high sulphur content and also with fuel having a relatively low sulphur content.

Accordingly, FIG. 3 shows an exhaust gas after-treatment system 2 which in turn comprises an oxidation catalytic converter 3 arranged downstream of the internal combustion engine 1 for the oxidation of $SO_2$ into $SO_3$ and a particle filter 4 arranged downstream of said oxidation catalytic converter 3 for filtering soot out of the exhaust gas, wherein however the exhaust gas after-treatment system 2 of FIG. 3 additionally comprises an oxidation catalytic converter 6 for the oxidation of NO into $NO_2$. The $NO_2$ extracted in the oxidation catalytic converter 6 likewise serves for the oxidation of soot in the particle filter 4 and thus the regeneration of the same.

In FIG. 3, the oxidation catalytic converter 6 for the oxidation of NO into $NO_2$ is connected parallel to the oxidation catalytic converter 3 for the oxidation of $SO_2$ into $SO_3$, wherein the exhaust gas of the internal combustion engine is conducted, dependent on the opening position of shut-valves 7, 8, either via the oxidation catalytic converter 3 or via the oxidation catalytic converter 6.

In particular when the internal combustion engine 1 is operated with a fuel that has a relatively high sulphur content, the shut-off valves 8 open and the shut-off valves 7 closed, so that the exhaust gas flow of the internal combustion engine 1 is then conducted via the oxidation catalytic converter 3 for the oxidation of $SO_2$ into $SO_3$ and the oxidation catalytic converter 6 for the oxidation of NO into $NO_2$ is separated from the exhaust gas flow. If by contrast the internal combustion engine 1 of FIG. 3 is operated with fuel that has a relatively low sulphur content, the shut-off valves 7 are opened and the shut-off valves 8 closed, so that the exhaust gas is conducted via the oxidation catalytic converter 6 for the oxidation of NO into $NO_2$, wherein the oxidation catalytic converter 3 for the oxidation of $SO_2$ into $SO_3$ is separated or shut off from the exhaust gas flow. The version of FIG. 3 is suitable in particular for use in marine engines, which on the one hand are operated with fuel having a relatively high sulphur content and on the other hand with fuel having a relatively low sulphur content. Here, dependent on the type of fuel used, suitably adapted passive regeneration of the particle filter 4 optionally via $NO_2$ or $SO_3$ can then be ensured.

During operation of the internal combustion engine 1 with fuel having a relatively high sulphur content the shut-off valves 7 are closed is the oxidation catalytic converter 6, which serves for the oxidation of NO into $NO_2$, kept free of sulphur. An alternative to this consists in omitting the shut-off valves and rendering the oxidation catalytic converter 6 operationally following operation with fuel having a relatively high sulphur content in that the exhaust gas temperature is raised and sulphur thus desorbed in the oxidation catalytic converter 6. The version with the shut-off valves 7, 8 however is preferred since following operation of the internal combustion engine 1 with sulphur-containing fuel the oxidation catalytic converter 6 is then ready for operation immediately following this.

In particular, the exhaust gas after-treatment system is employed in internal combustion engines which are operated with fuel the sulphur content of which amounts to at least 1,000 ppm.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An exhaust gas after-treatment system arranged in an exhaust gas flow of an internal combustion engine, comprising:
    a particle filter arranged downstream of the internal combustion engine configured to filter soot out of the exhaust gas; and
    an oxidation catalytic converter arranged upstream of the particle filter and downstream of the internal combustion engine configured to oxidize $SO_2$ into $SO_3$,
    wherein at least one of the $SO_3$ and precipitated $H_2SO_4$ serves for oxidation of soot in the particle filter for regeneration of the particle filter based at least in part on a temperature of the exhaust gas.

2. The exhaust gas after-treatment system according to claim 1,
    wherein the oxidation catalytic converter comprises at least one of vanadium, sodium, iron, cerium, cesium, and oxides of these elements as active component for oxidation of $SO_2$ into $SO_3$,
    wherein the oxidation catalytic converter utilizes at least one of titanium oxide and silicon oxide as a base material.

3. The exhaust gas after-treatment system according to claim 1, wherein the oxidation catalytic converter active component comprises at least 5% vanadium.

4. The exhaust gas after-treatment system according to claim 1, wherein a mass ratio between $SO_3$ and soot is at least 7:1 downstream of the oxidation catalytic converter, proximate to the particle filter.

5. The exhaust gas after-treatment system according to claim 1, further comprising:
    a turbine for an exhaust gas turbocharger,
    wherein the oxidation catalytic converter is arranged upstream of the turbine of the exhaust gas turbocharger and the particle filter is positioned downstream of the turbine.

6. The exhaust gas after-treatment system according to claim 1, further comprising:
    an oxidation catalytic converter for oxidation of NO into $NO_2$ arranged upstream of the particle filter and downstream of the internal combustion engine,
    wherein the $NO_2$ serves for the oxidation of soot in the particle filter and the regeneration of the particle filter.

7. The exhaust gas after-treatment system according to claim 6, wherein the oxidation catalytic converter for oxidation of NO into $NO_2$ is connected parallel to the oxidation catalytic converter for oxidation of $SO_2$ into $SO_3$.

8. The exhaust gas after-treatment system according to claim 7, further comprising:
    shut-off valves configured to shut off at least one of the oxidation catalytic converter for the oxidation of NO into $NO_2$ and the oxidation catalytic converter for oxidation of $SO_2$ into $SO_3$ from the exhaust gas flow based at least in part on the Sulphur content of a fuel provided to the internal combustion engine.

9. The exhaust gas after-treatment system according to claim 2,
    wherein the base material is stabilized by tungsten oxide.

10. The exhaust gas after-treatment system according to claim 3, wherein the oxidation catalytic converter active component comprises at least 9% vanadium.

11. The exhaust gas after-treatment system according to any one of the claim 4, wherein the mass ratio between $SO_3$ and soot is at least 16:1.

12. A method for exhaust gas after-treatment of exhaust gas leaving an internal combustion engine, comprising:
    providing the exhaust gas to an oxidation catalytic converter for oxidation of $SO_2$ into $SO_3$;
    providing the exhaust gas, after oxidation by the oxidation catalytic converter, to a particle filter configured to filter soot out of the exhaust gas; and
    regenerating the particle filter by oxidation of soot in the particle filter with at least one of the $SO_3$ formed in the oxidation catalytic converter and precipitated $H_2SO_4$ based at least in part on a temperature of the exhaust gas.

13. The method for exhaust gas after-treatment according to claim 12,
  wherein during operation of the internal combustion engine with a fuel having a high Sulphur content, shutting off the exhaust gas flow by shut-off valves to an oxidation catalytic converter for oxidation of NO into $NO_2$ so the exhaust gas flow is provided to the oxidation catalytic converter for the oxidation of $SO_2$ into $SO_3$, and
  wherein during operation of the internal combustion engine with a fuel that has a relatively low Sulphur content, shutting off the exhaust gas flow by shut-off valves to the oxidation catalytic converter for the oxidation of $SO_2$ into $SO_3$ so the exhaust gas flow is provided to the oxidation catalytic converter for the oxidation of NO into $NO_2$.

14. The method for exhaust gas after-treatment according to claim 13, wherein the high Sulphur content is a Sulphur content of the fuel above 1,000 ppm.

\* \* \* \* \*